(12) United States Patent
Jong

(10) Patent No.: US 10,216,993 B2
(45) Date of Patent: Feb. 26, 2019

(54) INTELLIGENT DOCUMENT ELEMENTS HARVEST AND PRESENTATION SYSTEM AND METHOD

(71) Applicant: Cheng Ning Jong, North Chili, NY (US)

(72) Inventor: Cheng Ning Jong, North Chili, NY (US)

(*) Notice: Subject to any disclaimer, the term of this patent is extended or adjusted under 35 U.S.C. 154(b) by 0 days.

(21) Appl. No.: 15/616,129

(22) Filed: Jun. 7, 2017

(65) Prior Publication Data

US 2018/0068182 A1  Mar. 8, 2018

Related U.S. Application Data

(60) Provisional application No. 62/383,581, filed on Sep. 5, 2016.

(51) Int. Cl.
| | |
|---|---|
| *H03M 7/00* | (2006.01) |
| *H03M 7/30* | (2006.01) |
| *H03M 5/00* | (2006.01) |
| *G06K 9/00* | (2006.01) |
| *G06Q 50/18* | (2012.01) |
| *G06F 17/24* | (2006.01) |
| *G06F 17/27* | (2006.01) |

(Continued)

(52) U.S. Cl.
CPC ....... *G06K 9/00476* (2013.01); *G06F 17/241* (2013.01); *G06F 17/2705* (2013.01); *G06F 17/278* (2013.01); *G06K 9/00456* (2013.01); *G06K 9/00469* (2013.01); *G06Q 50/184* (2013.01); *G06F 17/211* (2013.01); *G06F 17/24* (2013.01); *G06F 17/30011* (2013.01); *G06F 17/3028* (2013.01)

(58) Field of Classification Search
CPC .......... G06K 9/00476; G06K 9/00456; G06K 9/00469; G06F 17/241; G06F 17/278; G06Q 50/184
USPC .......................................................... 715/231
See application file for complete search history.

(56) References Cited

U.S. PATENT DOCUMENTS 4,974,175 A * 11/1990 Suzuki ..................... G06T 11/60
345/536
5,774,833 A * 6/1998 Newman ................. G06F 17/211
704/9

(Continued)

*Primary Examiner* — Cesar B Paula
*Assistant Examiner* — Luu-Phuong T Nguyen
(74) *Attorney, Agent, or Firm* — Tracy Jong Law Firm; Tracy P. Jong; Cheng Ning Jong

(57) ABSTRACT

A non-transitory computer readable medium storing a program causing a computer to execute a parsing process including extracting one or more figure descriptions from a first entity of document in a sequential order and calculating the number of figure descriptions from the first entity of the document having figure descriptions; extracting one or more drawing pages from a second entity of document in a sequential order and calculating the number of drawing pages from the second entity of the document having drawing pages; computing a varying list of figure descriptions; and combining the varying list of figure descriptions with one of the one or more drawing pages to produce the single output, whereby a user of the single output can readily identify a figure number of the one of the one or more drawing pages and associate the figure number with a description from the varying list of figure descriptions.

16 Claims, 14 Drawing Sheets

FIG. 1

(51) Int. Cl.
   *G06F 17/30*   (2006.01)
   *G06F 17/21*   (2006.01)

(56) References Cited

U.S. PATENT DOCUMENTS

| | | | | |
|---|---|---|---|---|
| 6,005,586 | A * | 12/1999 | Morita | G06T 11/40 |
| | | | | 345/624 |
| 7,724,249 | B1 * | 5/2010 | Horikawa | G06F 17/211 |
| | | | | 345/418 |
| 7,890,851 | B1 * | 2/2011 | Milton, Jr. | G06F 17/248 |
| | | | | 705/310 |
| 8,036,493 | B1 * | 10/2011 | Neustel | G06K 9/00442 |
| | | | | 345/658 |
| 8,160,306 | B1 * | 4/2012 | Neustel | G06Q 10/10 |
| | | | | 345/556 |
| 8,358,852 | B2 * | 1/2013 | Bastos dos Santos | |
| | | | | G06K 9/00449 |
| | | | | 382/100 |
| 8,605,100 | B2 * | 12/2013 | Sugama | G06T 1/60 |
| | | | | 345/543 |
| 8,954,845 | B2 * | 2/2015 | Misawa | G06F 17/2235 |
| | | | | 715/204 |
| 9,152,860 | B2 * | 10/2015 | Cervin | G06K 9/00483 |
| 2009/0276694 | A1 * | 11/2009 | Henry | G06F 17/30616 |
| | | | | 715/243 |
| 2013/0262968 | A1 * | 10/2013 | Gartman | G06F 17/2705 |
| | | | | 715/202 |

* cited by examiner

BRIEF DESCRIPTION OF THE DRAWINGS

Other features and advantages of the present invention will become apparent in the following detailed description of the preferred embodiments of this invention, with reference to the accompanying drawings, in which:

FIG. 2 is a schematic view of an apparatus used in the first preferred embodiment;

FIG. 3 is a sectional view of a breathable film laminate made by the first preferred embodiment;

*FIG. 2*

DETAILED DESCRIPTION OF THE PREFERRED EMBODIMENTS

Figure 1:
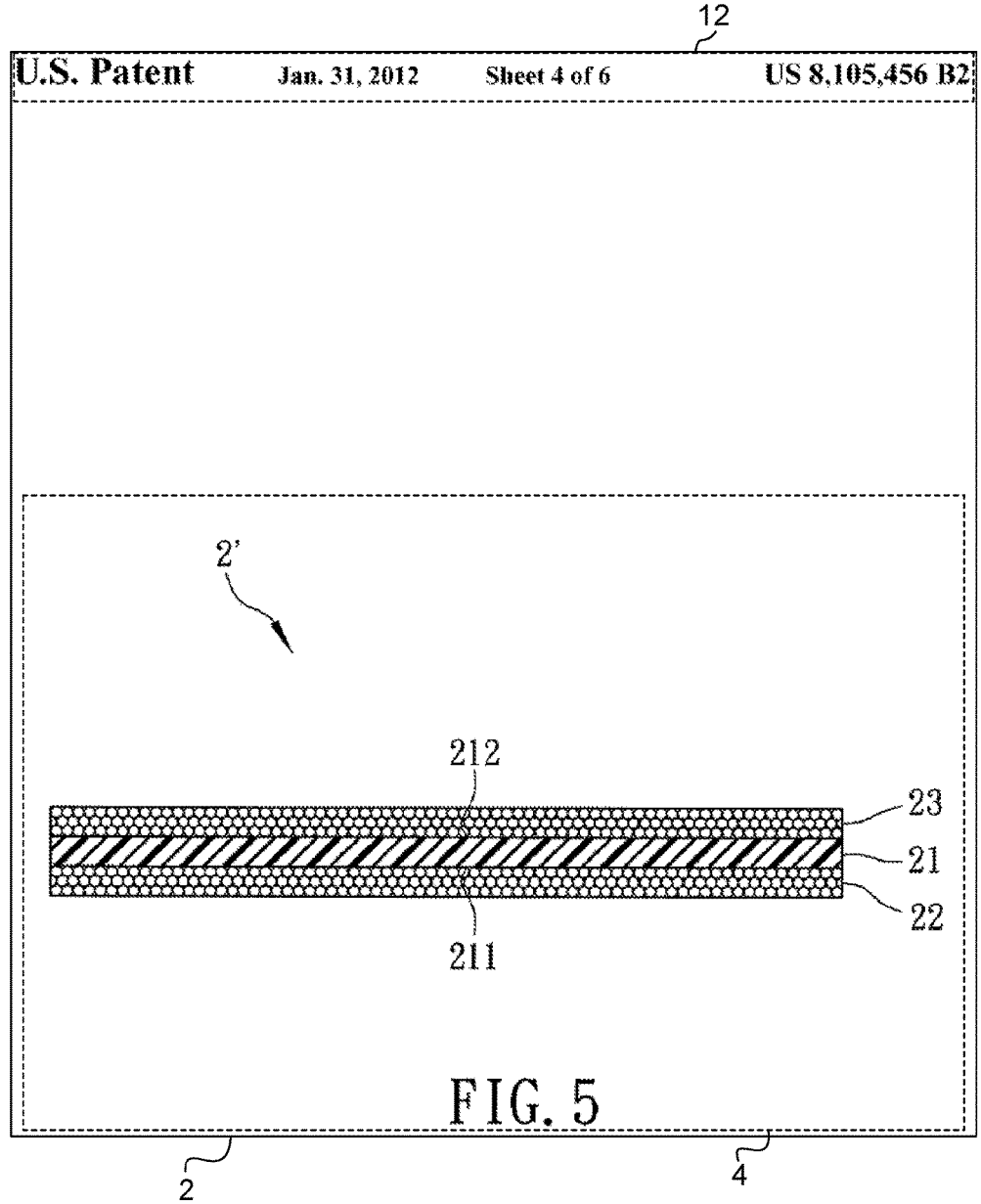
FIG. 1 is a flowchart illustrating the first preferred embodiment of a method for making a breathable film laminate according to this invention.

Before the present invention is described in greater detail with reference to the accompanying preferred embodiments, it should be noted herein that like elements are denoted by the same reference numerals throughout the disclosure.

Referring to FIGS. 1 to 3, a method of making a breathable film laminate 2 according to the first preferred embodiment of the invention includes steps 11 to 15.

In step 11, a first TPU film 21 is wound around a roller 20 and is advanced to a roller pressing device 5.

In step 12, a layer of film-formable liquid composition (A) is applied to a continuous first release substrate 3. The liquid composition (A) contains a film-formable resin in admixture with a volatile component, and is applied to the first release substrate 3 using a coating device.

The film-formable resin may be any suitable resin. In the preferred embodiments, the film-formable resin is polyurethane or an acrylic polymer. The volatile component may be a suitable solvent that can leave micropores in the resin when volatilized from the resin. In this embodiment, the volatile component is selected from methyl ethyl ketone, ethyl acetate, water, and combinations thereof.

In step 13, the liquid composition A on the first release substrate 3 is heated using an oven 4 so as to expel the volatile component, thereby forming a first porous film 22 having a multiplicity of micropores on the first release substrate 3. The first release substrate 3 with the first porous film 22 is advanced to the roller pressing device 5.

FIG. 3

INTELLIGENT DOCUMENT ELEMENTS HARVEST AND PRESENTATION SYSTEM AND METHOD

PRIORITY CLAIM AND RELATED APPLICATIONS

This non-provisional application claims the benefit of priority from provisional application U.S. Ser. No. 62/383,581 filed on Sep. 5, 2016. Said application is incorporated by reference in its entirety.

BACKGROUND OF THE INVENTION

1. The Field of the Invention

The present invention relates to a system and method for parsing an unstructured document for multiple discrete elements and combining two or more of these discrete elements to form an output having information that is easily accessible to a user. More specifically, the present invention is directed to a system and method for parsing an unstructured patent document for figure descriptions, drawing pages and additionally parts list and combining them to form an output having information that is easily accessible to a user.

2. Background Art

The challenges of reading and comprehending documents, e.g., patent documents, e.g., patents and patent applications have discouraged many non-patent practitioners and practitioners alike, from spending the requisite time in fully grasping the gist of inventions disclosed in such documents. Drawings are necessary for the full disclosure of many inventions. Therefore, many patents and applications contain drawings. Such drawings are typically line drawings annotated only with part numbers and figure numbers as no other information, e.g., part and figure descriptions are permitted on the sheet of the drawings. Therefore, in reading and comprehending a patent disclosure, a reader is often forced to print out hardcopies of pages of patent documents and put them next to one another such that the part and figure descriptions can be made available on the same view of the reader. Readers have also routinely hand write descriptions next to the numbers to reduce the amount of cross referencing of information that needs to take place in comprehending such documents. The same effect may be achieved by electronically displaying pages of such documents on large or multiple displays. However, a user must still first locate the appropriate pages for drawing figures, figure descriptions and parts that are peppered within pages of specification, and upon having located the appropriate pages, open one page at a time and finally arrange the pages in a way that the user can quickly alternate his view between the pages to glean information from appropriate pages. Such activity is tedious and distracts the user from his or her attention to other activities required to comprehend the actual contents of the document. Although optical character recognition (OCR) technology has been used in many areas involving textual recognition, its use in graphical arts (including mixed images and characters) has not been widespread due to the capricious nature of hand-drawn or computer generated images. Although most patent authorities require that patent drawings be produced according to strict standards, e.g., the fonts are required to be of certain sizes, the line thickness has been of certain values, etc., the quality of patent submissions vary widely. Reproduction of patent documents can further degrade patent documents. In some practices, all submissions of patent applications, regardless of whether the submissions are mailed-in submissions or electronic/web/online submissions, are first printed out as hardcopies which are subsequently scanned in for reproduction and public consumption. These various additional steps taken by these patent offices can only degrade the drawings of the submissions as no new useful information is added to the end results of such activities. Therefore, although some OCR technologies may be used to distinguish text contents, e.g., numbers, special characters, and letters, etc., from line drawings or drawings in general, they require certain settings to be made, e.g., the expectation of the size of the text, the expectation of the line thickness of the fonts, the intensity threshold of artifacts to be ignored on the sheet, etc. In summary, although OCR technologies may be manually tuned to pick out intended features from unstructured data visual data, the results in many occasions have been less than satisfactory.

There exists a need for a mechanism for merging relevant data derived from multiple disparate pages on the same page for human reading and comprehension. Tremendous amounts of natural resources and time have been wasted in manually putting together such disparate pages or simply flipping the disparate pages every time a piece of information is required.

SUMMARY OF THE INVENTION

In accordance with the present invention, there is provided a non-transitory computer readable medium storing a program causing a computer to execute a parsing process, the parsing process including:

(a) extracting one or more figure descriptions from a first entity of a document in a sequential order and calculating the number of figure descriptions from the first entity;

(b) extracting one or more drawing pages from a second entity of the document in a sequential order and calculating the number of drawing pages from the second entity;

(c) computing a varying list of figure descriptions for at least one output page totaling the number of drawing pages; and (d) combining the varying list of figure descriptions with one of the one or more drawing pages to produce the at least one output page, whereby a user of the at least one output page can readily identify a figure number from the one or more drawing pages and associate the figure number with an item of one of the varying list of figure descriptions of the at least one output page.

In one embodiment, the document is a patent document. In one embodiment, at least one of the one or more drawing pages is cropped from the second entity of the document. In one embodiment, step (b) further includes detecting each of the one or more drawing pages for an indication of a text to result in a first number of detections, and rotating each of the one or more drawing pages and detecting the each of the one or more drawing pages for an indication of a text to result in a second number of detections, wherein if the second number is greater than the first number, the each of the one or more drawing pages is retained in its rotated state. In one embodiment, the text is a figure label or a number.

In one embodiment, the computing step includes calculating a start index and an end index of the varying list of figure descriptions, wherein the start index is a function of a result of dividing the number of figure descriptions by the number of drawing pages and the end index is a function of the sum of the index and the product of a bandwidth and the number of figure descriptions.

In one embodiment, the bandwidth is a function of the number of the one or more drawing pages. In one embodiment, the bandwidth is inversely proportional to the number of the one or more drawing pages.

In one embodiment, the parsing process further includes extracting a parts list from a third entity of the patent document and combining the parts list with the varying list of figure descriptions and the one or more drawing pages to form an enhanced output, whereby the user of at least one output page can readily access information from the varying list of figure descriptions, one of the one or more drawing pages and the parts list and the user can additionally and readily identify a part number of the one of the one or more drawing pages and associate the part number with a description of a part from the parts list.

In one embodiment, the non-transitory computer readable medium further includes extracting at least one perceived part number from one or more drawing pages and looking up the at least one perceived part number in the parts list, wherein if the at least one perceived part number matches a part number of the parts list, the at least one perceived part number is displayed in the at least one output page, further enhancing the comprehension of the user of contents of the at least one output page.

In accordance with the present invention, there is provided a non-transitory computer readable medium storing a program causing a computer to execute a parsing process of a patent document, the parsing process including:

(a) extracting a perceived part number from a patent drawing of the patent document at a location of the patent drawing;

(b) extracting a list of part numbers from a description of the patent document with their corresponding descriptions;

(c) looking up the perceived part number in the list of part numbers to indicate whether the perceived part number is found in the list of part numbers; and (d) Overlaying the perceived part number and its corresponding description over the patent drawing in the vicinity of the location such that a user can visually access the perceived part number and its corresponding description and the patent drawing all within the same view if the perceived part number is found in the list of part numbers.

In one embodiment, the patent document is scaled and steps (a)-(c) are repeated.

In one embodiment, the vicinity of the location is a location away from the center of the patent drawing.

An object of the present invention is to provide a system and method for associating figure descriptions which are available on a first distinct portion of a document and their corresponding figures of the document which are available on a second distinct portion of the document, on the same resulting sheet, to facilitate human reading and comprehension of such document.

An object of the present invention is to provide a system and method for associating figure descriptions which are available on a first distinct portion of a document, their corresponding figures of the document which are available on a second distinct portion of the document and their corresponding parts list which is derived from a third distinct portion of the document, on the same resulting sheet, to facilitate human reading and comprehension of such document.

Another object of the present invention is to provide a resulting sheet having the least amount of non-relevant information such that human attention can be more readily drawn to relevant information.

Another object of the present invention is to provide a resulting sheet having all text and image contents displayed in the same orientation to facilitate human reading and comprehension of the contents.

Another object of the present invention is to provide a resulting sheet having the least amount of non-relevant information such that human attention can be more readily drawn to relevant information without additional actions from the user.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 is a diagram depicting one example of an original image of a patent document.

FIG. 2 shows a portion of the specification where figure descriptions are placed in the specification as published by the United States Patent and Trademark Office (USPTO).

FIG. 3 shows a portion of the specification where part descriptions can be found in the specification as published by the USPTO.

FIGS. 4-9 depicts a series of resulting images derived from a patent document.

Figure 10:
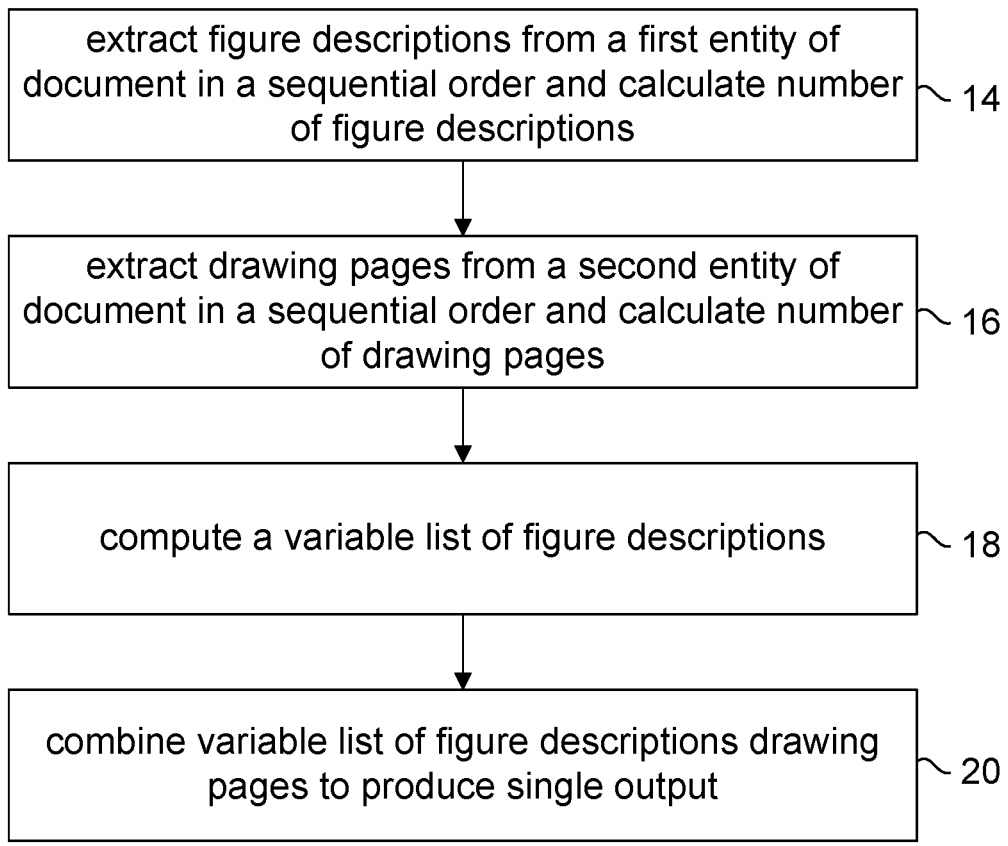

FIG. 10 is a flow diagram depicting a process by which an annotated drawing page is derived from a patent document.

Figure 11:
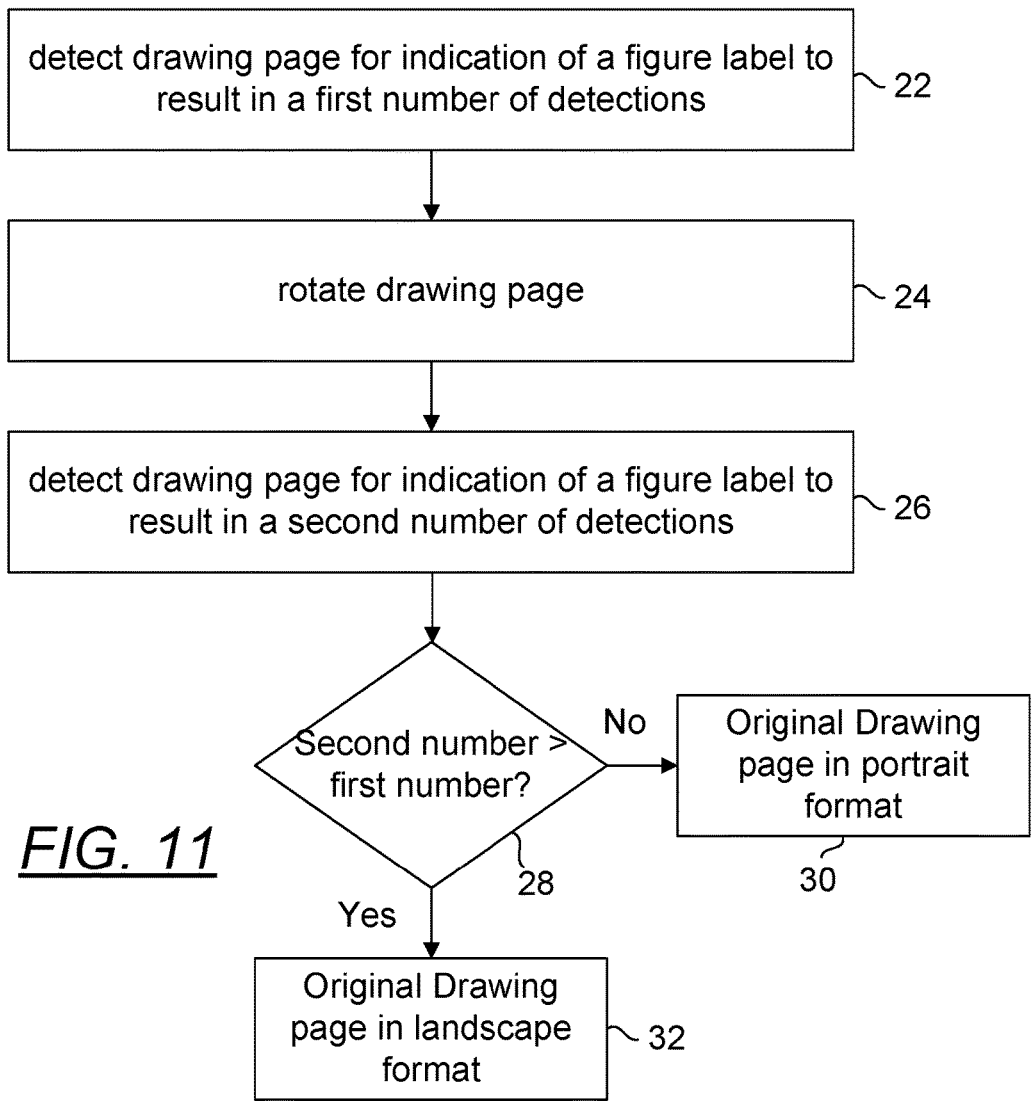

FIG. 11 is a flow diagram depicting a process by which a resulting orientation of a drawing figure is determined.

Figure 12:
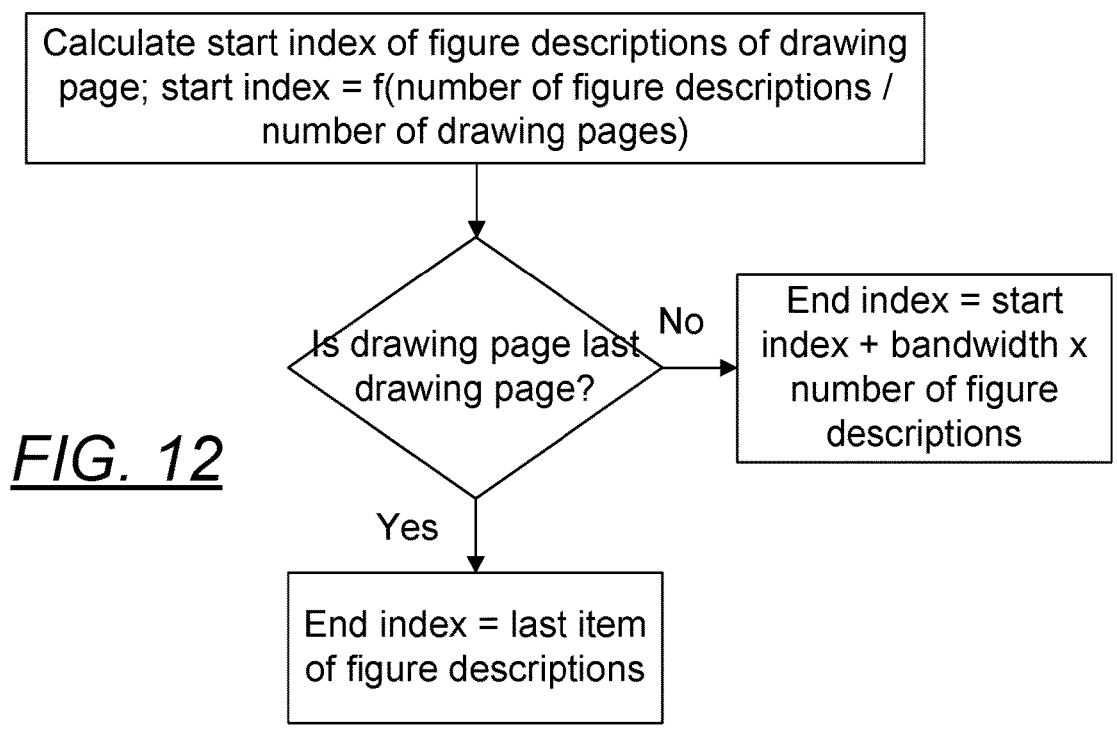

FIG. 12 is a flow diagram depicting a process by which the start and end indices of a drawing page is determined.

Figure 13:
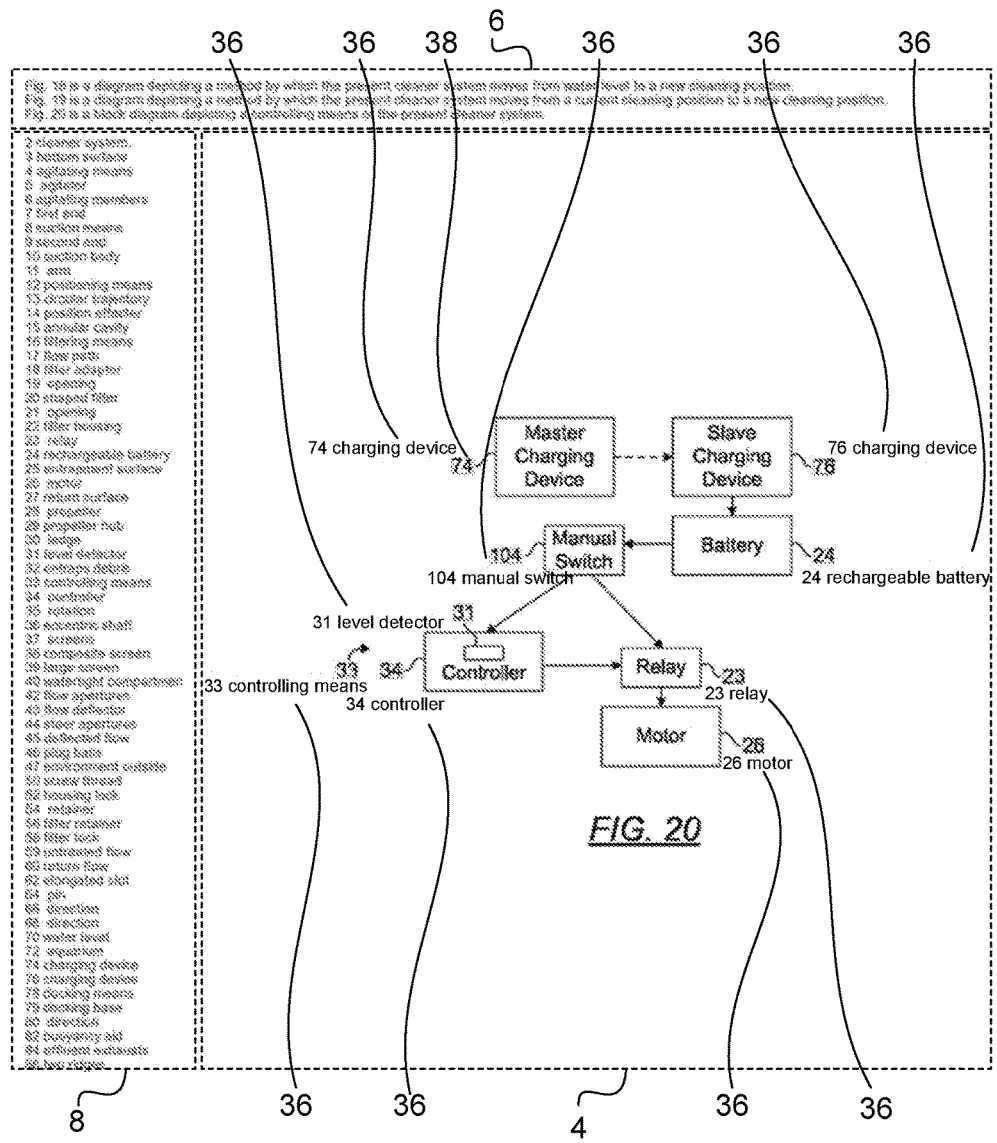

FIG. 13 is one example of a resulting image derived from a patent document, depicting part descriptions overlaid over figures.

Figure 14:
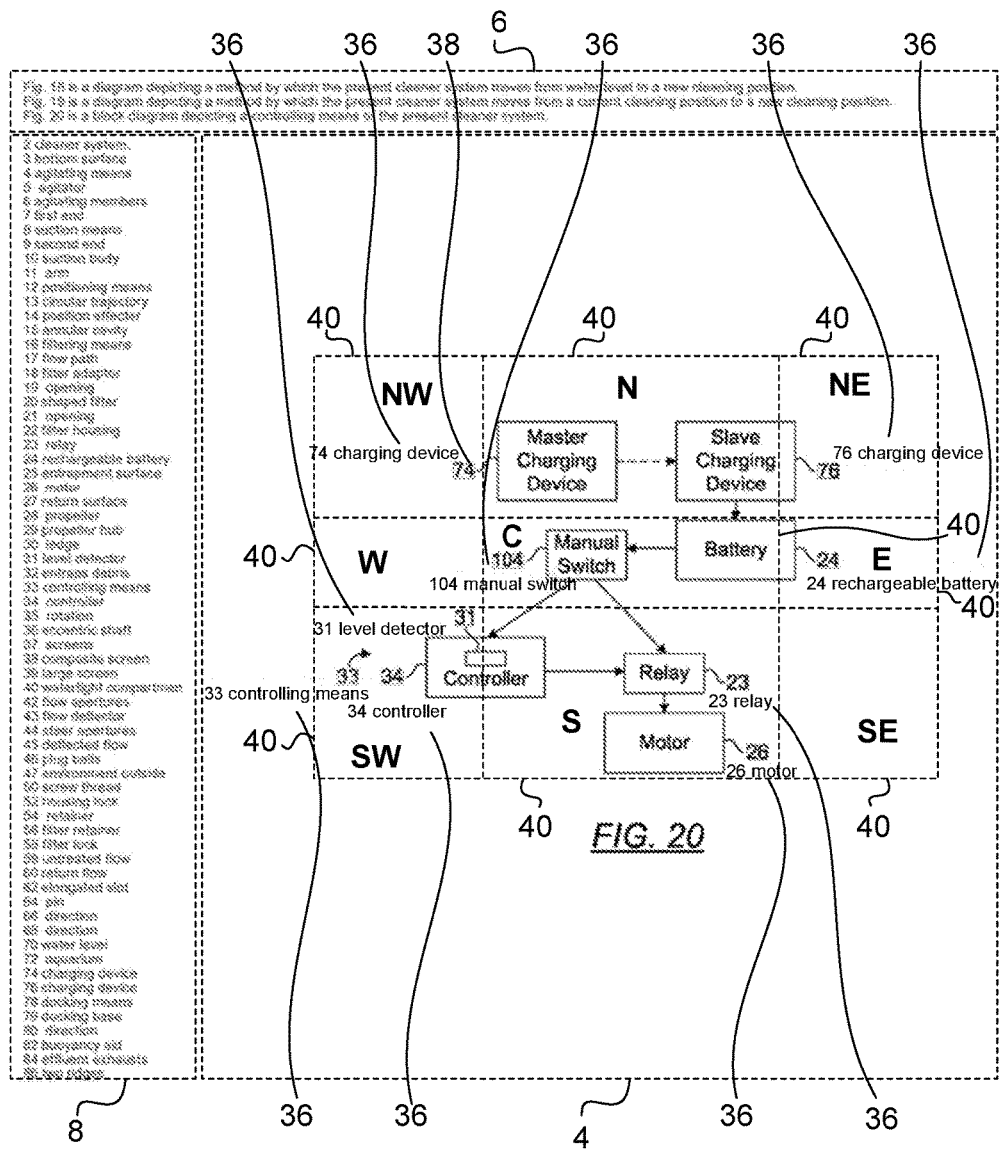

FIG. 14 is one example of a resulting image derived from a patent document, depicting part descriptions overlaid over figures and a mechanism for determining the locations in which the part descriptions are disposed relative to their respective parts.

PARTS LIST

2—original patent document or drawing page
4—cropped drawing

6—figure descriptions
8—parts list
10—blank sheet
12—header information
14—step of extracting figure descriptions from a first entity of document in a sequential order and calculate number of figure descriptions
16—step of extracting drawing pages from a second entity of document in a sequential order and calculate number of drawing pages
18—step of computing a varying list of figure descriptions
20—step of combining a varying list of figure descriptions and drawing pages to produce a single output
22—step of detecting drawing page for indication of a figure label to result in a first number of detections
24—step of rotating drawing page
26—step of detecting drawing page for indication of a figure label to result in a second number of detections
28—step where second number is compared to first number
30—answer indicating original drawing page is in portrait format
32—answer indicating original drawing page is in landscape format
34—original figure description
36—original part description
38—bounding box
40—element of a 3-by-3 matrix

PARTICULAR ADVANTAGES OF THE INVENTION

In one embodiment, the present system and method automatically associates figure descriptions with drawing figures, thereby removing the need for manually writing figure descriptions on drawing pages to aid reading and comprehension of patent documents. In one embodiment, parts list are further added to drawing pages to further aid reading and comprehension of a human of patent documents. In one embodiment, part descriptions are overlaid in the vicinity of their respective part numbers in drawing figures, further aiding reading and comprehension of a human of patent documents.

In associating figure descriptions with drawing figures or part descriptions with parts in drawing figures, no customizations of optical character recognition (OCR) settings are required for each set of drawing pages although the drawing pages may contain drawing figures of varying and insufficient qualities. Therefore, compared to OCR intensive routines, the present system and method takes relatively little computing resources and conclude in a reasonable amount of time and feasible even for realtime processing and presentation of results.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

FIG. 1 is a diagram depicting one example of an original image 2 of a patent document. More specifically, it is a page from a published patent, U.S. Pat. No. 8,105,456. Such image is published in an area distinct from the specification of the patent document. An image may contain one or more figures and it may be shown in the portrait or landscape format. In this example, there is only one figure published on the page. In this example, a header 12 indicates the origin of the document, i.e., it is a U.S. patent, the issue date of the patent, i.e., "Jan. 31, 2012," the position of this page with respect to the drawing pages, i.e., it is sheet 1 out of a total of 6 drawing pages and the patent number. It shall be noted that no other information is available on the same page to indicate what each part number 2', 212, 211, 23, 21, 22 or FIG. 5 represents. As the figure descriptions and part descriptions are published in their respective areas in the specification of the patent document, a reader of such document is undoubtedly required to take one or more additional steps to facilitate the "marriage" of such information in order to make reading and comprehension of such document more effective. In finding out what these part numbers and figure number represent, the user must refer back to the specification. FIG. 2 shows a portion of the specification where figure descriptions 34 are placed in the specification as published by the United States Patent and Trademark Office (USPTO). FIG. 3 shows a portion of the specification where part descriptions 36 can be found in the specification as published by the USPTO. Therefore, in order to correlate the parts of the drawing figure shown in FIG. 1 and their descriptions, one must flip the pages back and forth. One must also memorize what he or she just viewed from the previous page/s in order to comprehend the contents holistically. In contrast, the present system and method is configured to automatically merge the figure information on a single sheet for each drawing page as shown in FIGS. 4-9 which depict a series of resulting images derived from a patent document. It shall be noted that in each of FIGS. 4-9, several figures descriptions 6 are disposed on the top of each page, a parts list 8 on the left hand side of a cropped drawing FIG. 4 of FIG. 1) and below the figure descriptions 6. As described elsewhere herein, a program stored in a non-transitory computer readable medium is used to cause a computer to execute to carry out various actions on a document to produce output pages suitable for aiding comprehension of the document by a user. In one embodiment, one or more drawing figures are cropped from the original document such that only relevant information is presented to a reader. It shall also be noted that figure descriptions may vary from one page to another as only descriptions thought to be most relevant are displayed. If an overflow column of parts list is required, it is to expand to the right hand side of the column. The drawing figure/s are to be sized according to space left by the figure descriptions and parts list on the blank sheet 10.

Figure 4:
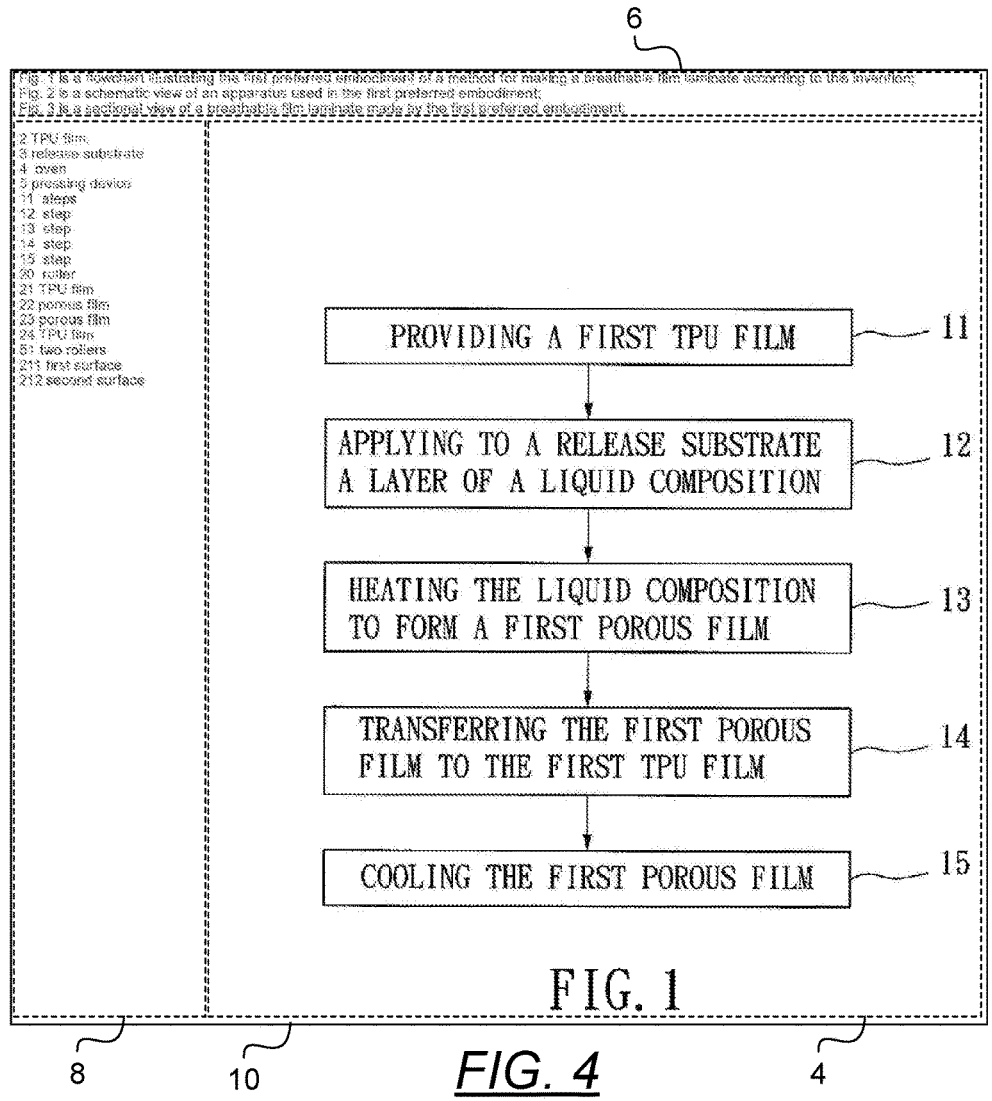
FIG. 4 is a flowchart illustrating the second preferred embodiment of the method for making a breathable film laminate according to this invention.
Figure 5:
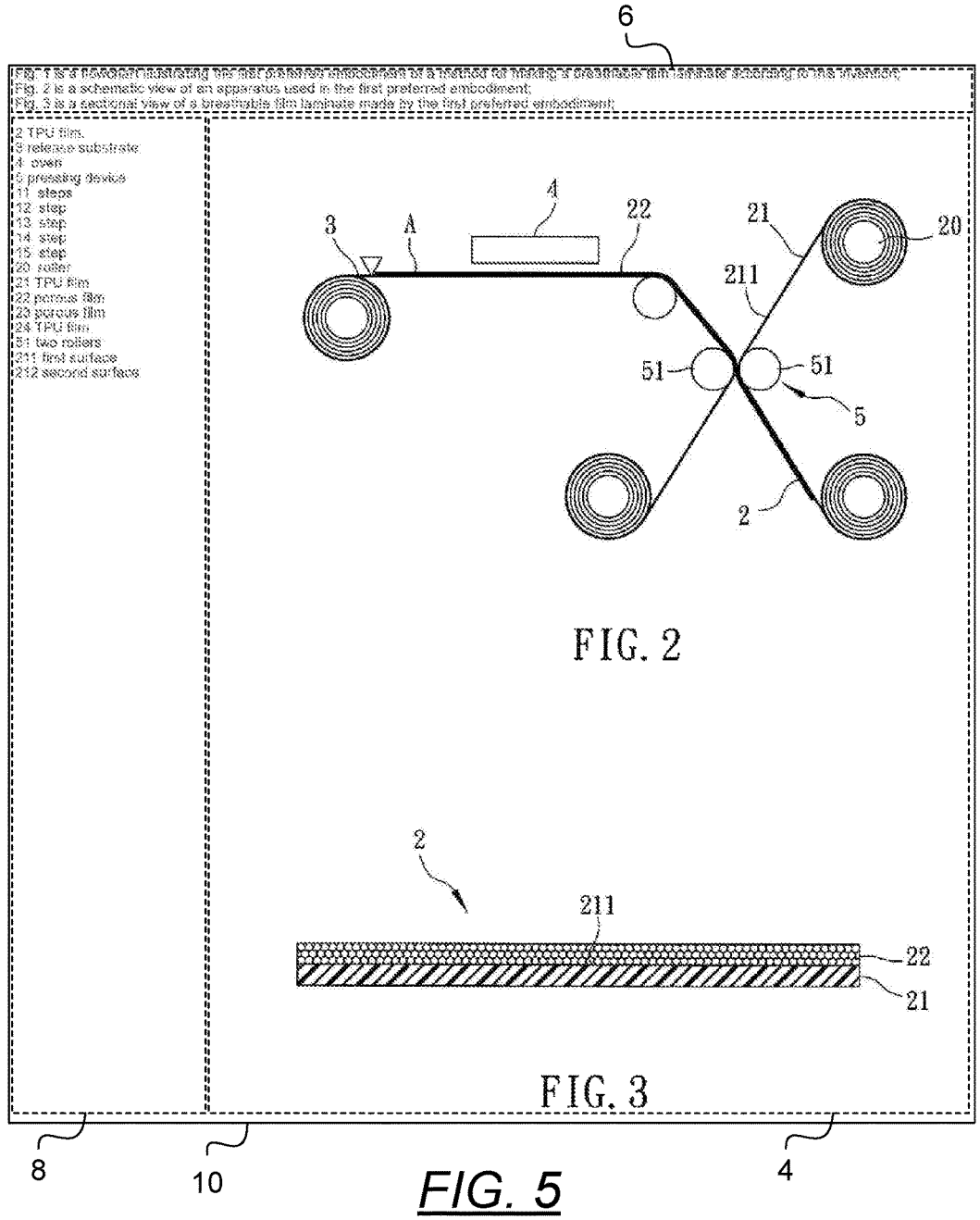
FIG. 5 is a sectional view of a breathable film laminate made by the second preferred embodiment.

Referring to FIG. 4, descriptions of a short list of FIGS. 1-3 of U.S. Pat. No. 8,105,456 are included although in this case, only one is required as there is only one drawing figure, i.e., FIG. 1 of U.S. Pat. No. 8,105,456. FIG. 4 depicts FIG. 1 of U.S. Pat. No. 8,105,456. Therefore, a reader of FIG. 4 can readily pick out the description of FIG. 1 of U.S. Pat. No. 8,105,456 from the short list of FIGS. 1-3 of U.S. Pat. No. 8,105,456. Referring to FIG. 5, descriptions of FIGS. 1-3 of U.S. Pat. No. 8,105,456 are still included. Again, a reader of the FIG. 5 can readily pick out the descriptions of FIGS. 2 and 3 of U.S. Pat. No. 8,105,456 from the short list of FIGS. 1-3 of U.S. Pat. No. 8,105,456. However, in FIG. 6, descriptions of FIGS. 2-4 of U.S. Pat. No. 8,105,456 are included instead. Therefore, a reader of the FIG. 6 can readily pick out the descriptions of FIG. 4 of U.S. Pat. No. 8,105,456 from the short list of FIGS. 2-4 of U.S. Pat. No.

Figure 6:
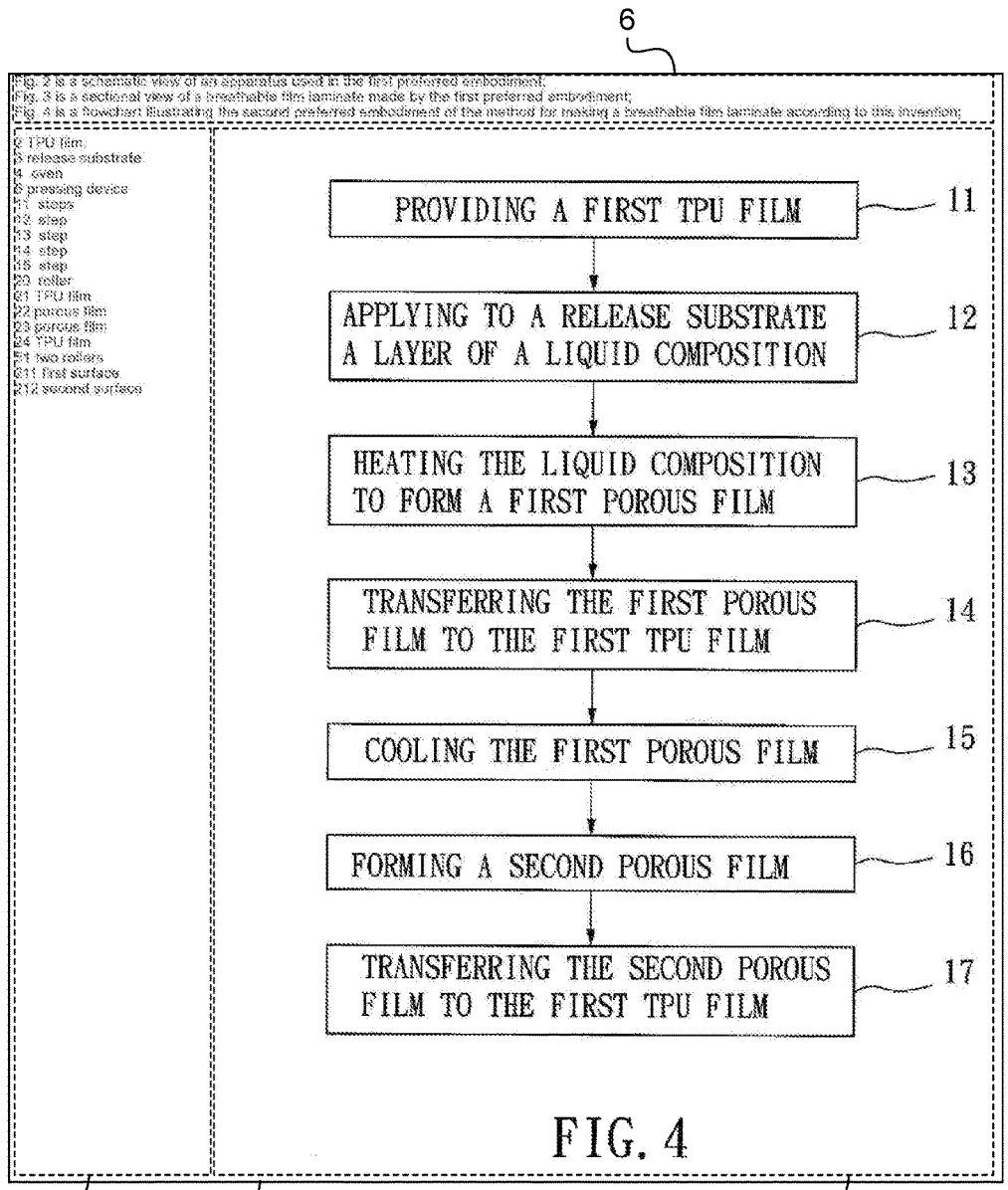
FIG. 6 is a flowchart illustrating the third preferred embodiment of the method for making a breathable film laminate according to this invention.
Figure 7:
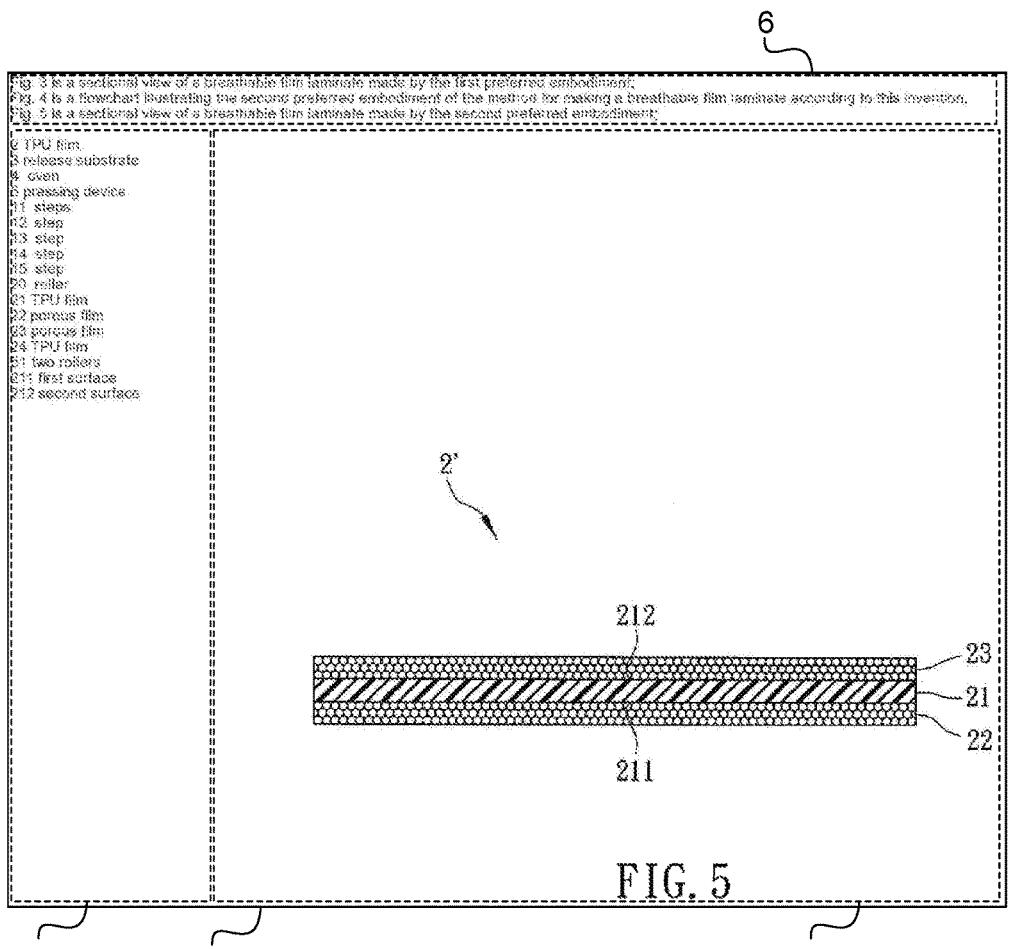
FIG. 7 is a sectional view of a breathable laminate made by the third preferred embodiment.
Figure 8:
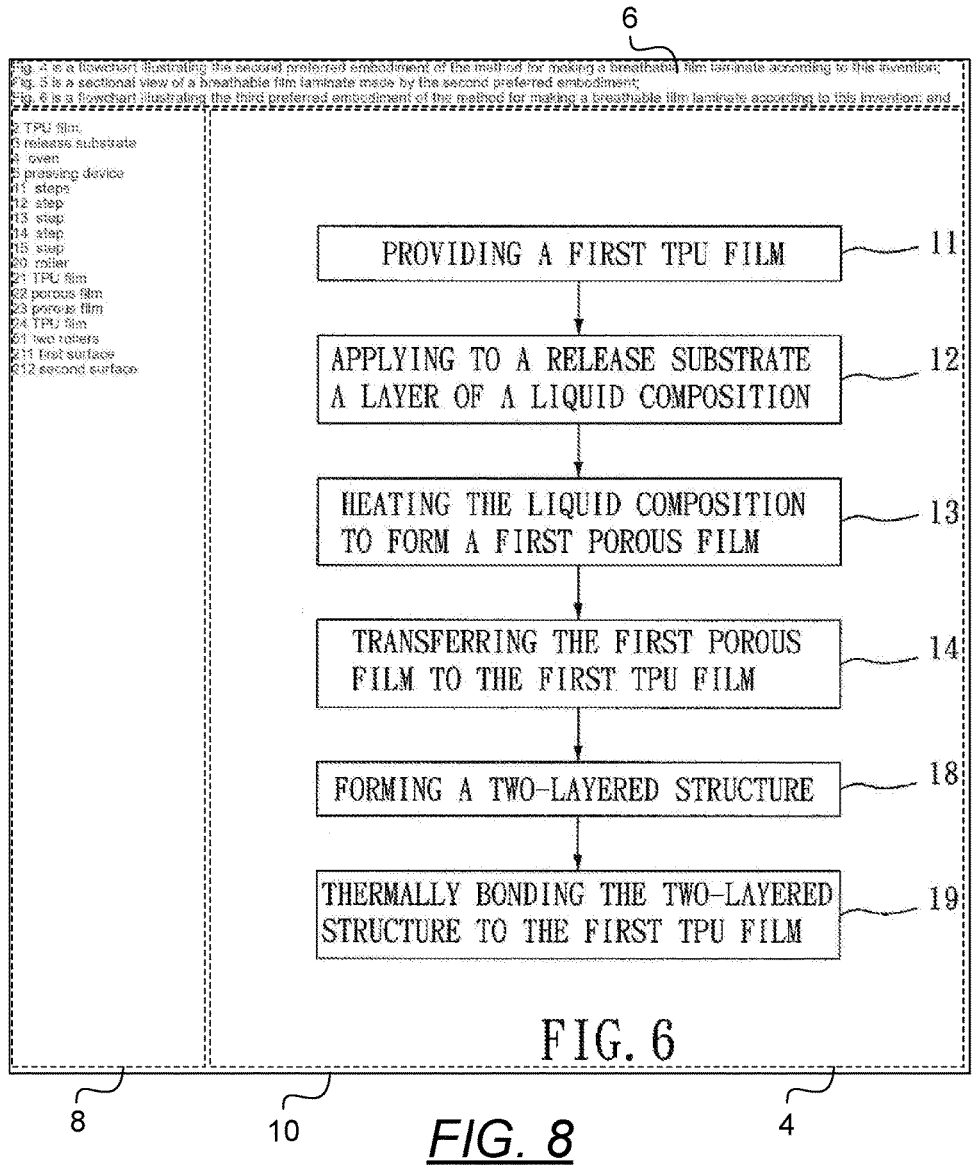
Figure 9:
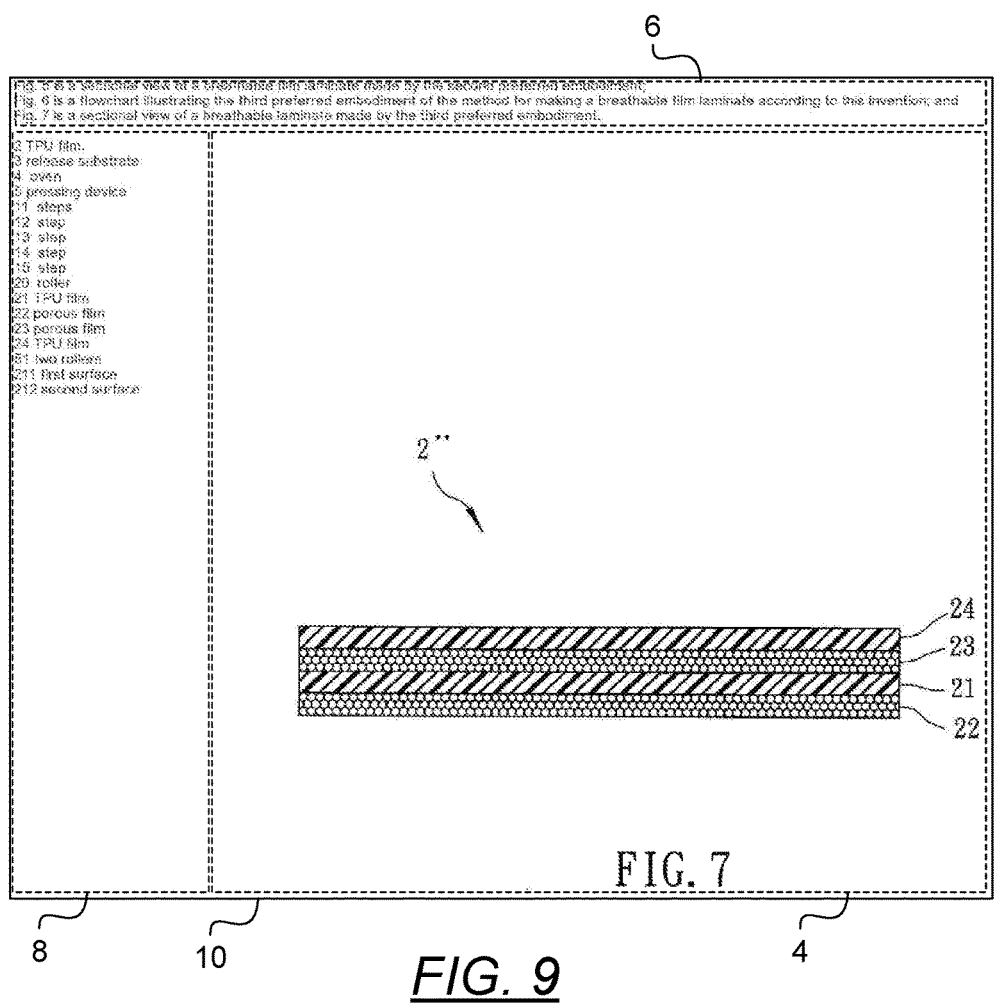

8,105,456. Referring now to FIG. 7, descriptions of FIGS. 3-5 of U.S. Pat. No. 8,105,456 are included instead, thereby facilitating the correlation and comprehension of FIG. 5 of U.S. Pat. No. 8,105,456 with its description. Referring next to FIG. 8, descriptions of FIGS. 4-6 of U.S. Pat. No. 8,105,456 are included instead, thereby facilitating the correlation and comprehension of FIG. 6 of U.S. Pat. No. 8,105,456 with its description. Referring next to FIG. 9, descriptions of FIGS. 5-7 of U.S. Pat. No. 8,105,456 are included instead, thereby facilitating the correlation and comprehension of FIG. 7 of U.S. Pat. No. 8,105,456 with its description. It shall be noted, from FIGS. 4-9, that a corresponding description is available for each figure of U.S. Pat. No. 8,105,456 even a short list is used instead of a full list. A short list facilitates reading and comprehension of the drawing figures as it reduces the amount of irrelevant information on each drawing page.

A full list of descriptions may be used instead on each page shown in FIGS. 4-9 to ensure that a description is available for each figure of U.S. Pat. No. 8,105,456 on each drawing page. However, a full list of descriptions will present a user "too much information" or "too much irrelevant information" as there may be only one description that is necessary on one page. For high quality original drawing pages, it may also be possible to parse the figure number/s to a high degree of certainty. In such cases, only the pertinent figure descriptions are displayed or presented. However, most drawing pages are not of sufficient quality that this can be practical. Therefore, the present system and method proposes displaying a varying list of figure descriptions as shown in FIG. 10 to address problems associated with low quality original drawing pages or manually associating figure descriptions and parts list to drawing figures.

FIG. 10 is a flow diagram depicting a process by which an annotated drawing page is derived from a patent document. In accordance with the present invention, there is provided a non-transitory computer readable medium storing a program causing a computer to execute a parsing or harvesting process, the parsing process including:
- (a) extracting (step 14) one or more figure descriptions from a first entity of a document in a sequential order and calculating the number of figure descriptions from the first entity;
- (b) extracting (step 16) one or more drawing pages from a second entity of the document in a sequential order and calculating the number of drawing pages from the second entity;
- (c) computing (step 18) a varying list of figure descriptions for at least one output page totaling the number of drawing pages; and
- (d) combining (step 20) the varying list of figure descriptions with one of the one or more drawing pages to produce the at least one output page, whereby a user of the at least one output page can readily identify a figure number from the one or more drawing pages and associate the figure number with an item of one of the varying list of figure descriptions of the at least one output page.

In one embodiment, the parsing process further includes extracting a parts list from a third entity (e.g., as shown in FIG. 3) of the patent document and combining the parts list with the varying list of figure descriptions and the one or more drawing pages to form an enhanced output, whereby the user of the single output can readily access information from the varying list of figure descriptions, the one of the one or more drawing pages and the parts list and the user can additionally and readily identify a part number of the one of the one or more drawing pages and associate the part number with a description of a part from the parts list. In one embodiment, a part number and its corresponding description is detected by scanning through the third entity one word at a time. If a word is determined to be an integer or an integer followed by an alphabet, e.g., "14$b$" or an integer followed by a character "'," e.g., "14'," one or more words prior to the current word is checked against a known noun. If these words have been determined to be a noun, they will be added to the parts list as the part description along with the part number.

A varying list of figure descriptions of a current single output, as used herein, is defined as a list of figure descriptions that can potentially vary from the list in the single output just prior to the current single output in a series of resulting drawing pages. A varying list contains information (figure numbers and their corresponding descriptions) ranging from a starting figure with its description to an ending figure with its description. A bandwidth is defined as a factor affecting the size of this range. If bandwidth is increased, more figure descriptions will be included and this increases the likelihood that a match of a figure description to a figure of the drawing figure/s will be found.

However, by increasing the bandwidth, more irrelevant figure descriptions will be displayed, cluttering the single output. In one embodiment, the bandwidth is a function of the number of the one or more drawing pages. In one embodiment, the bandwidth is inversely proportional to the number of the one or more drawing pages. By presenting a range of figure numbers and their corresponding descriptions, it becomes more likely that one or more of the figure descriptions within the varying list of figures descriptions will match the figure/s of a drawing page. A starting figure is associated with a start index and an ending figure is associated with an end index. In one embodiment, start and end indices are determined based on a process disclosed in FIG. 12.

In cases where optical character recognition (OCR) is considered sufficiently reliable as the quality of drawing figures is sufficiently high, only the descriptions of detected parts or figures will be displayed with drawing figures. Further, in one embodiment, drawing figures are orientated in the same orientation as the figure and part descriptions. Drawing figures can come in the portrait or landscape format. FIG. 11 is a flow diagram depicting a process by which a resulting orientation of a drawing figures is determined. In this embodiment and referring to both FIGS. 10 and 11, the second extracting step further includes detecting (step 22) each of the one or more drawing pages for an indication of a text to result in a first number of detections. An indication of a text can be the successful detection of part numbers or a figure label, e.g., "FIG.," etc. Each of one or more drawing pages is then rotated as shown in step 24. Again, each of the one or more drawing pages is processed as in step 26 for an indication of a text to result in a second number of detections. If the second number of a drawing page is determined in step 28 as greater than the first number of the drawing page, the drawing page is retained in its rotated state as in step 32. Otherwise, the drawing page is determined to be already in portrait format as in step 30.

FIG. 12 is a flow diagram depicting a process by which the start and end indices of a drawing page is determined. In one embodiment, the computing step (step 18 of FIG. 10) includes calculating a start index and an end index of the one or more figure descriptions of each of the one or more drawing pages. In one embodiment, the start index is a function of a result of dividing the number of figure descriptions by the number of drawing pages or:

> Start index=$f$(number of figure descriptions/number of drawing pages), where $f$ represents the function of operand number of figure descriptions/number of drawing pages.

The end index is the sum of the start index and the product of a bandwidth and the number of figure descriptions or:

> End index=$f$(start index+bandwidth×number of figure descriptions), where $f$ represents the function of operand start index+bandwidth×number of figure descriptions.

Therefore, it can be seen that when start index and end index are applied to the index of a drawing page in a series of drawing pages, the group of figure descriptions also moves along with the index. The start index essentially takes into account the speed at which each group of figure descriptions should be advanced. If there are a large number of figure descriptions compared to the number of drawing pages (in other words, there are more drawing figures packed into drawing pages), the start index should be advanced more rapidly to account for the higher possibility that the figure descriptions will advance according to the drawing figures of the drawing pages.

In one embodiment, start index and end index are computed as follows. In this example, there are a total of 10 figures (each with a corresponding description) and displayed over 5 drawing pages. Assume the following figure distribution on each drawing page:

Drawing page 1: FIGS. 1, 2 and 3
Drawing page 2: FIGS. 4, 5 and 6
Drawing page 3: FIGS. 7
Drawing page 4: FIGS. 8 and 9
Drawing page 5: FIG. 10

Introduced elsewhere herein is the concept of a bandwidth to specify the desired number of figure descriptions for each drawing page. In one example, the bandwidth is determined according to the number of figures. In one embodiment, if the number of figures is less than 10, then the bandwidth is set at 0.50 or 50%. If the number of figures is less than 20 and over or equal to 10, then the bandwidth is set at 0.45 or 45%. If the number of figures is less than 30 and over or equal to 20, then the bandwidth is set at 0.35 or 35%. If the number of figures is less than 40 and over or equal to 30, then the bandwidth is set at 0.25 or 25%. If the number of figures is less than 50 and over or equal to 40, then the bandwidth is set at 0.15 or 15%. If the number of figures is less than 60 and over or equal to 50, then the bandwidth I set at 0.075 or 7.5%. For all other cases, the bandwidth is set at 0.035 or 35%.

In this example, as there are 10 figures, the bandwidth is then 0.45 or 45%.

Drawing Page 1:

> Start index=$f$(number of figure descriptions/number of drawing pages)=$f$(10/5)=$f$(2)=page number× 2=1×2=2

As the first figure always starts with FIG. 1, the start index is corrected to be 1.

> End index=$f$(start index+bandwidth*number of figure descriptions)=$f$(1+0.45×10)=$f$(5.5)

With 5.5 rounded up to 6, figure descriptions displayed: FIGS. 1-6

Drawing Page 2:

> Start index=$f$(number of figure descriptions/number of drawing pages)=$f$(10/5)=$f$(2)=page number× 2=2×2=4

> End index=$f$(start index+bandwidth*number of figure descriptions)=$f$(4+0.45×10)=$f$(8.5)

With 8.5 rounded up to 9, figure descriptions displayed: FIGS. 4-9

Drawing Page 3:

> Start index=$f$(number of figure descriptions/number of drawing pages)=$f$(10/5)=$f$(2)=page number× 2=3×2=6

> End index=$f$(start index+bandwidth×number of figure descriptions)=$f$(6+0.45×10)=$f$(10.5)

As the last figure is FIG. 10, the end index is corrected to be 10.

Figure descriptions displayed: FIGS. 6-10

Drawing Page 4:

> Start index=$f$(number of figure descriptions/number of drawing pages)=$f$(10/5)=$f$(2)=page number× 2=4×2=8

As the first figure always starts with FIG. 1, the start index is corrected to be 1.

> End index=$f$(start index+bandwidth×number of figure descriptions)=$f$(8+0.45×10)=$f$(12.5)

As the last figure is FIG. 10, the end index is corrected to be 10.

Figure descriptions displayed: FIGS. 8-10.

Drawing Page 5:

> Start index=$f$(number of figure descriptions/number of drawing pages)=$f$(10/5)=$f$(2)=page number× 2=5×2=10

> End index=$f$(start index+bandwidth×number of figure descriptions)=$f$(10+0.45×10)=$f$(14.5)

As the last figure is FIG. 10, the end index is corrected to be 10.

Figure descriptions displayed: FIG. 10.

Therefore, in this example, only a portion of the entire list of figure descriptions is displayed on the resulting image, making the short list more targeted for reader of the resulting image to reference figure descriptions. For instance, a reader of the first resulting image will find descriptions for only FIGS. 1-6 as compared to all of the figure descriptions, FIGS. 1-10. As only FIGS. 1-3 are displayed on the same page, the user can find the descriptions for all of the relevant figures on the page more easily. A reader of the next resulting image will find descriptions for only FIGS. 4-9 as compared to all of the figure descriptions, FIGS. 1-10. As only FIGS. 4-6 are displayed on the same page, the user can find the descriptions for all of the relevant figures on the page more easily. In one embodiment, the lower bound of the figure descriptions is the drawing page number. For instance, on drawing page 2, even if the figure description for FIG. 1 is still determined to be necessary, the lower bound should be limited to be FIG. 2.

It is also possible to detect the coordinates of the detected part numbers and figure labels such that their pertinent descriptions can be placed alongside them. FIG. 13 is one example of a resulting image derived from a patent document, depicting part descriptions 36 overlaid over figures. It shall be noted that, in addition to the figure descriptions 6 disposed on the top of the page and a parts list 8 on the left hand side of a cropped drawing 4 and below the figure descriptions 6, parts of the figure are annotated so that a reader of the figure can immediately associate a part description with a part number, without further referring to the parts list 8. However, patent figures come in various qualities, i.e., font types and sizes and line thicknesses, etc. An image feature extraction algorithm, e.g., those commercially available via Matlab® image processing module, open-source software, e.g., OpenCV and Tesseract may not readily extract all part numbers or any numbers from a drawing figure. Applicant discovered that, by iterating variably-scaled input images to a feature extraction software, the opportunity for detecting a part number is increased. Therefore, the more iterations are attempted, the more part numbers can be generally detected. However, the number of iterations is directly related to the total image processing time. In one embodiment, a patent drawing page is scaled from a factor of 0.5 (or 50% of original size) to a factor of 3.0 (or 3 times the original size). As an example, if a drawing figure is processed at the original drawing figure scale, parts '104' or '24' may be picked out. When the scale of the drawing figured is increased by 50% such that the new drawing figure is now 1.5 times the original drawing figure scale, these and other new parts, e.g., '74' and '76' may be picked out. The newly extracted numbers now add to the list of parts discovered. In another iteration, the original drawing figure may now be scaled 2 times the original drawing figure scale. This iteration may pick out another few new parts, e.g., '23', '26' and '31.' It can be seen now that by increasing the number of iterations of scaled original drawing figure scale, more part numbers may be detected. When a digit, letter, character or generically an item is detected, the detected item is first cached until no other adjacent part is detected. This step is important to distinguish a single digit part number from a multi-digit part number. For instance, a patent disclosure may contain part numbers '5' and '52.' If '52' has been incorrectly determined to be single digit part numbers '5' and '2,' not only will part number '52' have been missed, part '52' may be incorrectly label as '5' on the drawing figure. In this case, if "2" is determined to be located within the "vicinity" of "5" and to the downstream side of a writing flow, "2" is determined to be associated with "5" as a single entity. The location of a detected feature can be returned by an image feature extraction algorithm used to compute its bounding box that can be overlaid over the detected feature. The term "vicinity" is used to mean a distance ranging from several pixels to tens of pixels. The bounding box 38 serves as a confirmation to the detected feature. Note also that the bounding boxes 38 shown on FIGS. 13 and 14 encapsulate their respective part numbers instead of their individual digits. Upon detecting a part number, it is automatically looked up or verified against part numbers corresponding to parts list 8. If a detected part number exists in the parts list 8, then both the detected part number and its corresponding part description is overlaid over the drawing figure at a preferred location. The perceived part number is displayed such that the reader can verify that the part description overlaid is one that applies to the underlying part number. For example, if the perceived part number matches the underlying part number, the reader can be confident that the detected part number is correct. For example, part number "74" has been detected and a string of "74 charging device" is overlaid next to part "74" in the drawing figure shown in FIG. 13. The reader can be certain that the part shown in the drawing figure has been detected as it matches overlaid part number. If the overlaid part number and the underlying part number had been different, the reader will need to refer back to the parts list on the left hand side of the drawing figure or the part number in the description for its description. A preferred location is a location on an overlay that is more likely to not obscure the underlying image that it overlays. In the embodiment shown, an overlay is applied directly over the underlying image such that an output that includes the overlay and underlying image is obtained. An example output is a pdf file. In another embodiment, a marker, i.e., a red dot is overlaid in a preferred location such that the overlay can be kept to a minimum. The red dot is then linked to a pop-up screen that displays pertinent information including the corresponding part description and any other relevant information, e.g., one or more sentences prior to or after the occurrence of the part number in the description of a patent document. A reader can then identify the parts within a drawing figure quickly without referring to the part numbers in the description section or even the parts list overlaid to the left hand side of the drawing figure, speeding up and enhancing the comprehension of the invention disclosed in the patent document.

FIG. 14 is one example of a resulting image derived from a patent document, depicting part descriptions overlaid over figures and a mechanism for determining the locations in which the part descriptions are disposed relative to their respective parts. In overlaying perceived part descriptions over a drawing figure, it is imperative that the overlaid information does not obscure the underlying information. Applicant discovered that by overlaying part numbers and their corresponding part descriptions according to a certain manner, most underlying information will still be readable. In the embodiment shown in FIGS. 13 and 14, part numbers and their corresponding descriptions are disposed based on the location of the part numbers on the underlying drawing figure. In one embodiment, a drawing page is divided into a 3×3 matrix 40 or 9 elements (West (W), NorthWest (NW), North (N), NorthEast (NE), East (E), SouthEast (SE), South (S), SouthWest (SW) and Center (C). The element in which a part number falls in dictates how the perceived part number and its part description are displayed. Applicant discovered that by "spreading" the part numbers and their corresponding part descriptions, the reader can most readily comprehend these overlaid information. For instance, if a part number falls within the SE element, it is likely that if its part description is displayed on the upper left hand side of the part number, the part description will be less likely to obscure the part number or other parts of the drawing. Likewise, if a part number falls within the SE element, it is likely that if its part description is displayed on the lower right hand side of the part number, the part description will be less likely to obscure the part number or other parts of the drawing. In short, an overlaying part number and its corresponding part description are displayed at a location in a direction away from the center "C" element.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A non-transitory computer readable medium storing a program causing a computer to execute a parsing process, said parsing process comprising:
    (a) extracting one or more figure descriptions from a first entity of a document to result in a first number of figure descriptions from the first entity;
    (b) extracting one or more drawing pages from a second entity of the document to result in a second number of drawing pages each disposed on an output page;
    (c) generating a list of figure descriptions for said each output page, said generating step comprises calculating a start index and an end index of said list of figure descriptions, wherein said start index is a function of a result of dividing said first number by said second number and said end index is a function of the sum of said start index and the product of a bandwidth and said first number and assembling said list of figure descriptions from said one or more figure descriptions corresponding to the range from said start index to said end index; and
    (d) combining said list of figure descriptions with said each output page,
whereby a user of said each output page can look up a figure description of a figure on said each output page in said list of figure descriptions.

2. The non-transitory computer readable medium of claim 1, wherein the document is a patent document.

3. The non-transitory computer readable medium of claim 1, wherein at least one of said one or more drawing pages is cropped from said second entity of the document.

4. The non-transitory computer readable medium of claim 1, wherein said parsing process further comprises processing said one or more drawing pages for an indication of a text of a type selected from the group consisting of a figure label and a number.

5. The non-transitory computer readable medium of claim 1, wherein said bandwidth is a function of the number of said one or more drawing pages.

6. The non-transitory computer readable medium of claim 1, wherein said bandwidth is inversely proportional to the number of said one or more drawing pages.

7. The non-transitory computer readable medium of claim 1, further comprising extracting a parts list from a third entity of the patent document and combining said parts list in its entirety with said list of figure descriptions and said one or more drawing pages to form an enhanced output, whereby the user of at said each output page can readily access information from said list of figure descriptions, one of said one or more drawing pages and said parts list and the user can additionally and readily identify a part number of said one of said one or more drawing pages and associate said part number with a description of a part from said parts list.

8. The non-transitory computer readable medium of claim 7, further comprising extracting at least one perceived part number from said one or more drawing pages and looking up said at least one perceived part number in said parts list, wherein if said at least one perceived part number matches a part number of said parts list, said at least one perceived part number is displayed in said each output page, further enhancing the comprehension of the user of contents of said each output page.

9. The non-transitory computer readable medium of claim 1, said parsing process further comprises:
    (a) extracting a perceived part number from a patent drawing of the document at a location of the patent drawing;
    (b) extracting a list of part numbers from a description of the document with their corresponding descriptions;
    (c) looking up said perceived part number in said list of part numbers to indicate whether said perceived part number is found in said list of part numbers;
    (d) overlaying said perceived part number and its corresponding description over said patent drawing in the vicinity of said location such that a user can visually access said perceived part number and its corresponding description and said patent drawing all within the same view if said perceived part number is found in said list of part numbers; and
    (e) scaling the patent drawing from a low end scale to a high end scale and repeating steps (a)-(d) until the patent drawing has been scaled to said high end scale such that as many of said perceived part number has been extracted.

10. The non-transitory computer readable medium of claim 9, wherein said low end scale is 0.5 and said high end scale is 3.0.

11. The non-transitory computer readable medium of claim 9, wherein the vicinity of said location is a location away from the center of said patent drawing.

12. A method for combining a description of a figure and the figure of a document in at least one output page in a computing device, wherein the description of the figure is disposed in a first entity of the document and the figure is disposed in a second entity of the document and said first entity of the document cannot be readily disposed next to said second entity of the document, said method comprising:
    (a) extracting one or more figure descriptions from a first entity of the document to result in a first number of figure descriptions from the first entity;
    (b) extracting one or more drawing pages from a second entity of the document to result in a second number of drawing pages each disposed on an output page;
    (c) generating a list of figure descriptions for said each output page, said generating step comprises calculating a start index and an end index of said list of figure descriptions, wherein said start index is a function of a result of dividing said first number by said second number and said end index is a function of the sum of said start index and the product of a bandwidth and said first number and assembling said list of figure descriptions from said one or more figure descriptions corresponding to the range from said start index to said end index; and
    (d) combining said list of figure descriptions with said each output page,
    whereby a user of said each output page can look up a figure description of a figure on said each output page in said list of figure descriptions.

13. The method of claim 12, wherein the document is a patent document.

14. The method of claim 12, wherein said bandwidth is inversely proportional to the number of said one or more drawing pages.

15. The method of claim 12, further comprising extracting a parts list from a third entity of the patent document and combining said parts list in its entirety with said list of figure descriptions and said one or more drawing pages to form an enhanced output, whereby the user of said each output page can readily access information from said list of figure descriptions, one of said one or more drawing pages and said parts list and the user can additionally and readily identify a part number of said one of said one or more drawing pages and associate said part number with a description of a part from said parts list.

16. The method of claim 15, further comprising extracting at least one perceived part number from said one or more drawing pages and looking up said at least one perceived part number in said parts list, wherein if said at least one perceived part number matches a part number of said parts list, said at least one perceived part number is displayed in said each output page, further enhancing the comprehension of the user of contents of said each output page.

* * * * *